United States Patent
Jou

(10) Patent No.: US 6,213,411 B1
(45) Date of Patent: Apr. 10, 2001

(54) INLET OF BLOW GUN

(76) Inventor: Wuu-Cheau Jou, No. 95, Cheng Kung 2$^{nd}$ Road, Tali City, Taichung Hsien (TW)

( * ) Notice: Subject to any disclaimer, the term of this patent is extended or adjusted under 35 U.S.C. 154(b) by 0 days.

(21) Appl. No.: 09/350,307

(22) Filed: Jul. 9, 1999

(51) Int. Cl.$^7$ .................................................. B05B 7/02
(52) U.S. Cl. ..................... 239/526; 239/600; 285/286.1; 285/290.1; 285/293.1
(58) Field of Search .................................. 239/525, 526, 239/600, DIG. 21, DIG. 22; 285/392, 330, 286.1, 286.2, 290.1, 293.1

(56) References Cited

U.S. PATENT DOCUMENTS

| | | | |
|---|---|---|---|
| 3,599,876 | * 8/1971 | Kyburg | 239/526 |
| 3,811,622 | * 5/1974 | Blatt | 239/526 |
| 3,814,329 | * 6/1974 | Clark | 239/DIG. 22 |
| 4,867,380 | * 9/1989 | Sibbertsen | 239/526 |
| 5,286,001 | * 2/1994 | Rafeld | 285/330 |
| 5,832,974 | * 11/1998 | Jou | 239/600 |

* cited by examiner

*Primary Examiner*—Lisa Ann Douglas
(74) *Attorney, Agent, or Firm*—Rosenberg, Klein & Lee

(57) ABSTRACT

The present device relates to an inlet of a blow gun, and more particularly to a metal inlet combined in a plastic blow gun by injection molding. The metal inlet has an internal screw hole, and a polygonal outside surface or a ratchet-striated outside surface, to provide a high torque-resistant construction when integrally molded with the blow gun. One or more groove rings are formed in the outside surface of the metal inlet, the side walls of the groove ring form retainers to prevent it from moving out axially under a large axial force. The plastic blow gun integrated with the metal inlet has an excellent seal efficiency without any leakage, and the service life is increased greatly.

2 Claims, 3 Drawing Sheets

INLET OF BLOW GUN

BACKGROUND OF THE INVENTION

1. Field of the Invention

The present invention relates to an inlet of blow gun, and more particularly to a metal inlet combined in the plastic blow gun by injection molding the inlet tightly without it being loose and without leakage when it is in use.

2. Prior Art

In accordance with the conventional plastic blow gun, as shown in FIG. 1, the inlet 11 is provided with an internal screw thread 111 for connecting with a quick connector providing the compressed air from the compressed air source. So, the inlet 11 and the internal screw thread 111 are molded with the blow gun, integrally. However, there are some shortcomings existing in this structure, as follows:

1. Due to the physical phenomenon of heat-expansion and cool-shrinking, the cooling of the plastic after stripping from the high-temperature die, the internal screw thread 111 becomes distorted, or the teeth are contracted, so that the tightness of threaded engagement therewith is poor, even causing leakage.
2. Because the internal screw thread 111 is plastic, it is not rigid enough, so that the threaded engagement of the connection will loosen over time, and sometimes the surface of the internal screw thread 111 will be stripped off, causing leakage.
3. During long term use under high pressure with compressed air, the fatigue resistance of the plastic at the internal threaded portion is so short that the service life of the blow gun is affected.
4. Because the plastic has a poor strength and lack of rigidity, the internal screw thread 111 often is cross-threaded when screwing on the quick connector, causing the internal screw thread 111 to be damaged, even causing the inlet 11 to break.

For overcoming the above-mentioned shortcomings, a new blow gun has been brought out on the market, in which a reformed metal inlet 20 is embedded into the trunk of the blow gun, as shown in FIG. 2. The inlet 20 is presented to a cylinder having a ratchet striated outside surface, and a smaller diameter front tip end for embedding an O-ring 22, and a threaded internal screw hole 23. Referring to FIG. 3, a stepped hole 12 is formed at the intake position for embedding the metal inlet 20 therein. The end of the stepped hole 12 is sealed with the O-ring 22 for preventing the compressed air from leaking. Pressing the inlet 20 embeds the ratchet striated surface 21 into the stepped hole 12 for retaining the metal inlet 20 in place, so that the quick connector threads into the metal inlet 20 to overcome the shortcomings of the plastic inlet.

As the embedded inlet 20 is pressed into the plastic blow gun 10, it has an engaging depth of 0.2–0.3 mm, and the meshing strength is thereby very limited. When screwing on the quick connector, and for avoiding leakage and looseness, the threaded joint is often over-torqued with a large turning effort. Often the torque is sometimes so large that the engaging joint between the ratchet striated surface 21 and the plastic trunk of the blow gun causes the metal inlet 20 to slip off and to lose relative function. On the other hand, when pressing the metal inlet 20 into the plastic trunk of the blow gun 10, the central axis of the inlet 20 is often misaligned, so that the O-ring 22 cannot seal the end of the stepped hole well, with the result that the compressed air will leak during long term use under high pressure. Therefore, the service life of this kind of blow gun is not long enough, and the production cost cannot be easily reduced.

OBJECTS AND SUMMARY OF THE INVENTION

It is therefore a main object of the present invention to provide a metal inlet serving as a core bar embedded into the plastic blow gun during injection molding, so that the joint between them has more strength, thereby overcoming the poor connection and leakage problems of the prior art. Meanwhile, the strength of the teeth of the internal screw is increased.

For achieving that object, the metal inlet core provided by the present invention, a polygonal or deeper ratchet striated outside surface, meshes with the plastic trunk of the blow gun with more strength and more tightly, as it is integrally molded with the blow gun. It can resist greater torque, to prevent the metal inlet core from slipping off. It not only reduces the production cost, but also increases the service life of the blow gun.

For increasing the engaging area of the surface and the joint strength, the present invention provides the metal inlet with a polygonal or a ratchet striated outside surface in which a groove ring is formed transversely in the middle of the polygonal or the ratchet striated surface.

DETAILED DESCRIPTION OF THE PREFERRED EMBODIMENTS

Figure 1:
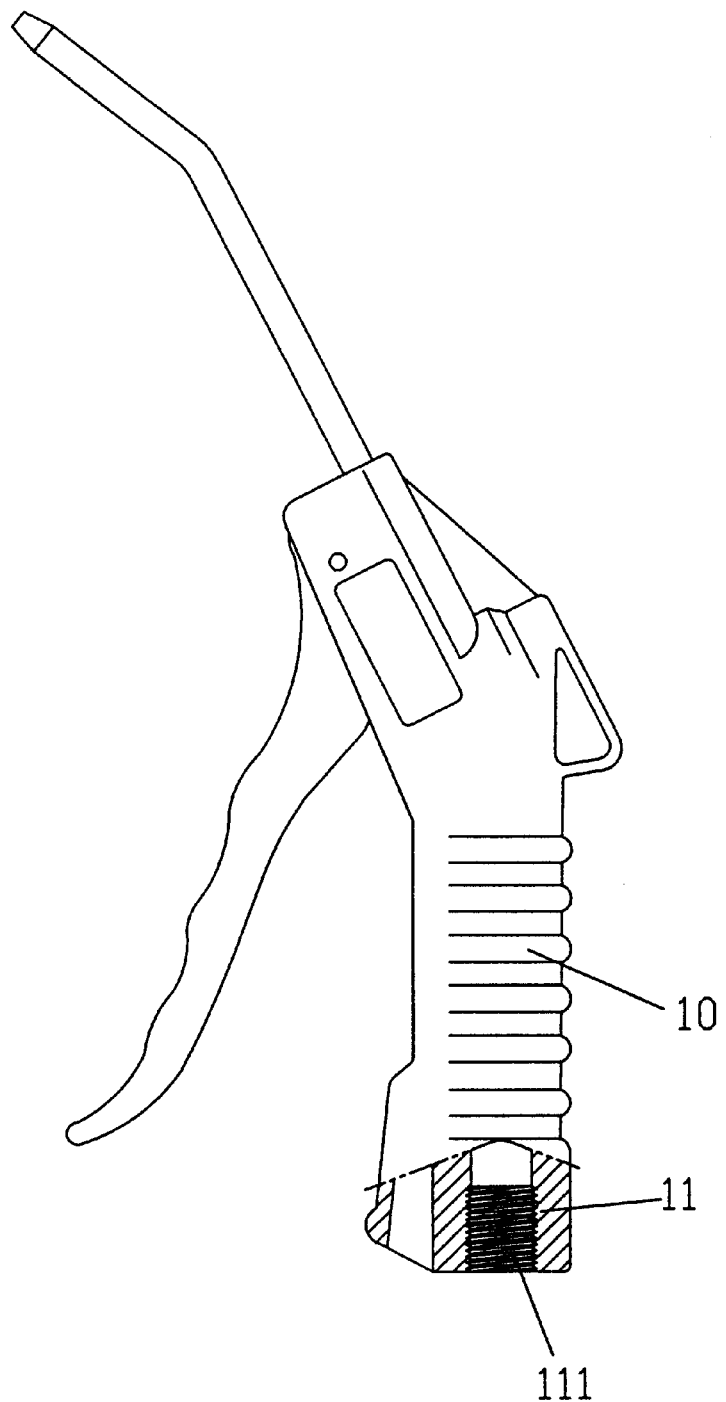
FIG. 1 is a side view of a prior art blow gun.
Figure 2:
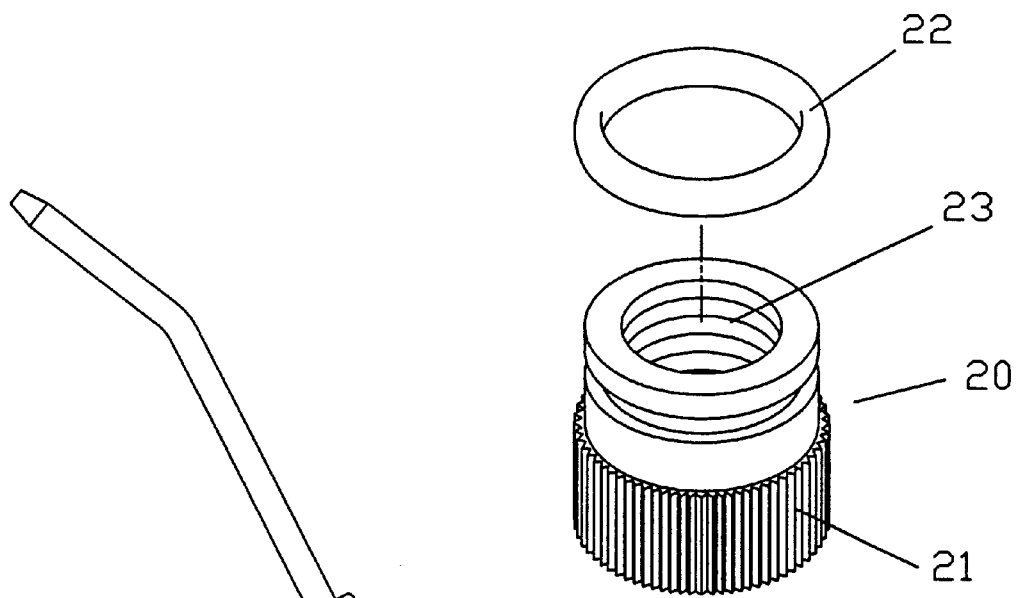
FIG. 2 is a perspective view of a metal inlet of another prior art device.
Figure 3:
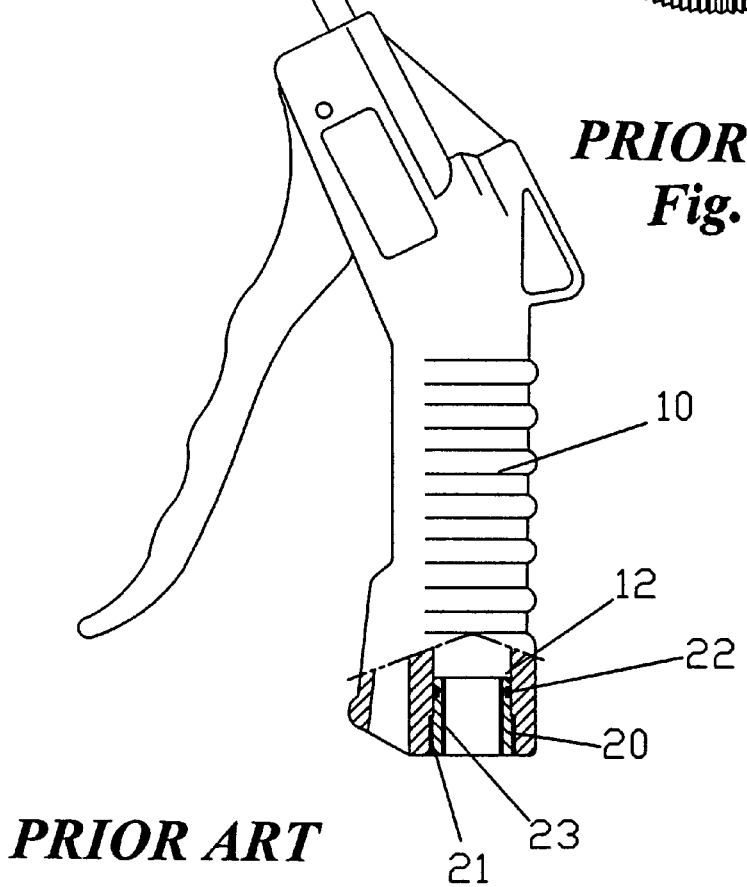
FIG. 3 is a side view, partially sectioned, showing the combination of the metal insert in the second prior art device.
Figure 5:
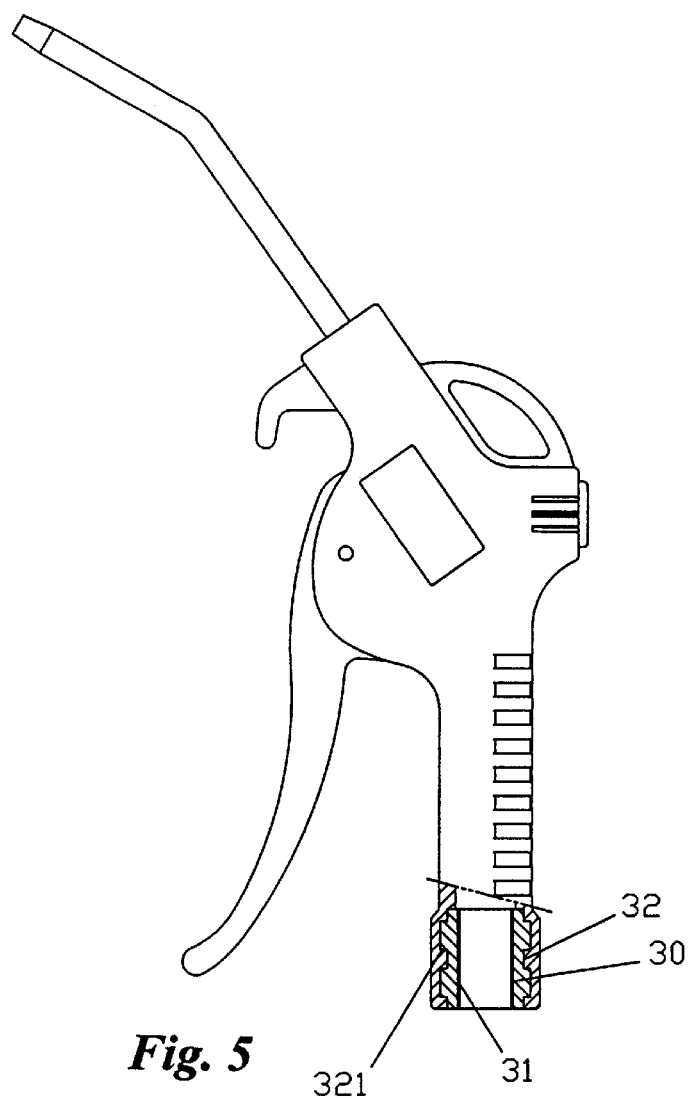
FIG. 5 is a side view, partially sectioned, showing the combination of the metal insert with the blow gun in the present invention.
Figure 4:
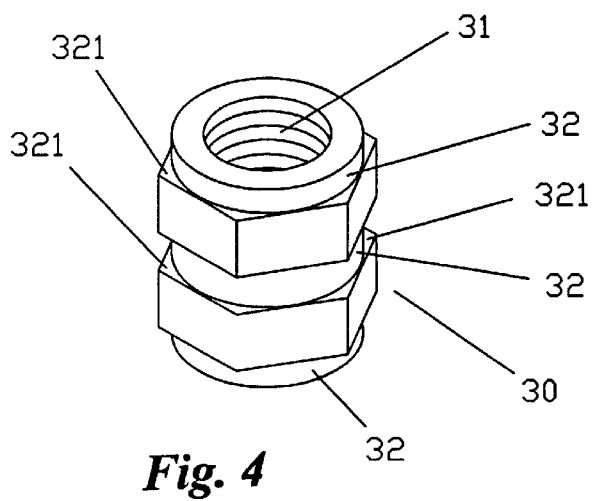
FIG. 4 is a perspective view showing a metal inlet of the present invention.

Referring to FIG. 4 and FIG. 5, the present invention provides a metal inlet 30 having an internal screw hole 31, a polygonal outside surface, and one or more groove rings 32 formed in the middle and adjacent both ends thereof. The side walls of the groove rings 32 form retainers 321. The metal inlet 30 is pre-located in the molding die, and by the injection molding process it is integrated into the trunk of the blow gun. The plastic of the blow gun interfuses into the groove rings 32 of the inlet 30 and covers the inlet 30 tightly.

By virtue of the polygonal outside surface contour, and being integrally molded with the blow gun, the inlet 30 is fixed against rotation, so it can withstand high torque, as when the quick connector is being screwed therein. Thus, the quick connector can be secured without any loosening thereby, even after being screwed in and out many times. The service life of the inlet 30 is thereby increased greatly.

Figure 6:
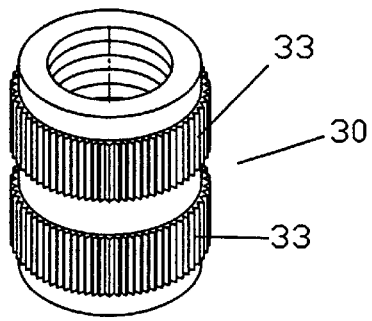
FIG. 6 is a perspective view showing a second configuration of a metal inlet of the present invention.

As an alternative to the polygonal surface, the outside surface of the inlet 30 can be formed with ratchet-striated surface 33, as shown in FIG. 6. The plastic of the blow gun interfuses into all the gaps between the teeth of ratchet-striated surface 33 to form an integral structure, so as to improve the torque-resistance strength and ability to bear a high torque when the quick connector is over-tightened.

By use of the groove rings 32 of the inlet 30, the inlet 30 is integrated with the trunk of the blow gun during its molding. The plastic interfuses into the groove rings 32, the side walls of the groove rings 32 form retainers 321, which not only engages the trunk of the blow gun tightly, but also prevents the inlet 30 from moving axially when an external axial force is applied thereto, such as when a high pushing force is applied by the compressed air or a pulling force is applied by the flexible air hose coupled thereto.

Due to the interfusing of the plastic during the molding process, the inlet 30 is integrated into the blow gun without any gap between them. Therefore, the leakage efficiency is very high.

By use of the metal material, the internal screw thread of the inlet 30 can withstand many repetitions of screwing a connector in and out, without there being any damage and distortion, and maintaining a good seal state. By integrating inlet 30 with the blow gun during molding, the polygonal surface or the ratchet-striated surface has a high torque resistance, and the retainers formed by the side walls of the groove rings can prevent the inlet from moving axially under an external axial force. The manufacturing procedures are simple, low cost and suitable for high production rates.

I claim:

1. A metallic inlet having an internally threaded longitudinally directed through hole for combination with a plastic blow gun, comprising:

a plastic blow gun having a trunk portion molded with the metallic inlet to form an integral structure; and, the metallic inlet having (a) a pair of longitudinally spaced portions each having a polygonal surface contour, and (b) a plurality of longitudinally spaced groove rings circumscribing the metallic inlet, each of the plurality of groove rings having side walls that form retaining surfaces acting against corresponding molded plastic surfaces of the trunk portion to resist axial displacement of the metallic inlet, at least one of the plurality of groove rings being disposed between the portions having the polygonal surface contour and another of the plurality of groove rings being respectively disposed adjacent each of two opposing ends of the metallic inlet.

2. A metallic inlet having an internally threaded longitudinally directed through hole for combination with a plastic blow gun, comprising:

a plastic blow gun having a trunk portion molded with the metallic inlet to form an integral structure; and, the metallic inlet having (a) a pair of longitudinally spaced portions each having a ratchet-striated surface contour, and (b) a plurality of longitudinally spaced groove rings circumscribing the metallic inlet, each of the plurality of groove rings having side walls that form retaining surfaces acting against corresponding molded plastic surfaces of the trunk portion to resist axial displacement of the metallic inlet, at least one of the plurality of groove rings being disposed between the portions having the ratchet-striated surface contour and another of the plurality of groove rings being respectively disposed adjacent each of two opposing ends of the metallic inlet.

* * * * *